United States Patent Office

Re. 26,541
Reissued Mar. 11, 1969

26,541

STABLE AQUEOUS GLYCOL SOLUTION OF TETRACYCLINE ALUMINUM CALCIUM GLUCONATE COMPLEX HAVING A pH OF ABOUT 7.5 TO 9

Edward Grant Remmers, Ridgewood, and George Madison Sieger, Montvale, N.J., and William Charles Barringer, Pearl River, N.Y., assignors to American Cyanamid Company, Stamford, Conn., a corporation of Maine No Drawing. Original No. 3,159,542, dated Dec. 1, 1964, Ser. No. 248,231, Dec. 31, 1962. Application for reissue Sept. 29, 1966, Ser. No. 589,163
U.S. Cl. 424—227 5 Claims
Int. Cl. A61k *27/00;* C07c *103/19*

Matter enclosed in heavy brackets [ ] appears in the original patent but forms no part of this reissue specification; matter printed in italics indicates the additions made by reissue.

This invention relates to novel liquid compositions of tetracycline, which are suitable for parenteral administration. Furthermore, the invention relates to stable liquid parenteral solutions of tetracycline aluminum calcium gluconate. These compositions are unique in that they possess the advantage of stability over a sustained period of time.

A thoroughly stable parenteral composition of tetracycline has been unavailable, and tetracycline for parenteral use was available only in the dry form, which required reconstitution immediately prior to administration. Therefore, although this mode of administration is adequate, the relative merits of the preparation are inhibited by the disadvantages inherent thereto. The disadvantages primarily reside in, the inconvenience of preparing the solution under adverse circumstances, as well as, the ease with which contamination could occur. Attempts to formulate tetracycline in a stable liquid preparation have not met with success. Formulations have included the use of aqueous propylene glycol as a vehicle and have resulted in preparations which were highly unstable. Upon dilution of the aforementioned preparations with copious amounts of water, a precipitate immediately resulted which was subsequently identified as the antibiotic. Accelerated stability studies to determine microbiological potency, expressed in milligrams per milliliter of tetracycline present in the preparation, have resulted in ascertaining a loss of approximately 85 percent over a three week period, when stored at 37° C.

A particular object of the present invention, therefore, is to provide a stable liquid preparation of tetracycline suitable for parenteral administration. Further objects will become obvious in the light of the following disclosure.

The inventors have discovered that contrary to the statement hereinbefore set forth, a stable liquid composition of tetracycline may be obtained by the use of the antibiotic metal acid complex, which is an association of molecules which are considered as being bound together by residual valences, dispersed in an aqueous solution containing 30–80% of a physiologically acceptable glycol. The tetracycline metal acid complex which is used to obtain the stable liquid compositions of the present invention is tetracycline aluminum calcium gluconate, which is described in U.S. Patent No. 2,736,725. It has been found that when this complex is dissolved in an aqueous solution of a physiologically acceptable glycol that a stable, parenterally acceptable solution results. Solutions of tetracycline aluminum calcium gluconate complex in a 70 percent propylene glycol solution, for example, at a pH of 8.5, retained 90 to 100 percent of initial potency after accelerated stability studies at 37° C. for nine weeks and 42° C. for two months. The stable liquid preparations were found effective in producing high blood levels comparable with blood levels produced by reconstituted aqueous preparations of these complexes, and were found generally quite suitable for parenteral use. A comparison of the stable liquid preparations of the present invention with those which were heretofore available, illustrates an outstanding improvement. The preparations of the present invention do not deteriorate and there is a concomitant retention of microbiological potency over a sustained period of time. Therefore, the problems inherent to those preparations which require reconstitution immediately prior to administration are obviated and preparations having uniform dosage levels are at last realized by the advent of the solutions of the present invention.

The complex is believed to have the composition of 1–2 moles of calcium per mole of tetracycline, 3–4 moles of aluminum per mole of tetracycline, and from 6–12 moles of gluconic acid per mole of tetracycline. The addition of more gluconic acid, although it would not affect the solubility, would serve no practical purpose. These complexes are prepared by known methods as described in U.S. Patent No. 2,736,725.

The vehicle employed in the present invention is an aqueous solution of a physiologically acceptable glycol, such as propylene glycol, glycerol, isopropylidene glycerol, and polyethylene glycol. Stable solutions are prepared using concentrations of 30–80 percent of physiologically acceptable glycols, the preferred range being between 50–75 percent. When the concentration of organic solvent is less than 20 percent, a haze develops in the solution, which is not pharmaceutically acceptable for parenteral preparations.

The composition is prepared by dissolving the tetracycline metal acid complex in water and then adding the remainder of the vehicle. The final composition is then titrated to a pH of 7.5–9.5 using a basic substance. The neutralizing agents to be used are those which are water soluble and physiologically acceptable, and have a dissociation constant of greater than $10^{-5}$. Among the most useful neutralizing agents are the lower aliphatic amines, such as monoethanolamine, diethanolamine and triethanolamine.

The composition may also be prepared by formation of the tetracycline metal acid complex in situ. However, when aluminum isopropoxide is used as the source of aluminum ions which is the preferred process, it is necessary to remove the isopropanol which results as a byproduct in the formation of the complex. The removal of the isopropanol is necessitated by the fact that isopropanol is not physiologically acceptable.

Of particuar concern in the preparation of stable liquid preparations of tetracycline is the problem of discoloration which may result as an effect of oxidative degradation. This can be overcome by the addition of a physiologically acceptable and pharmaceutically compatible antioxidant or by the exclusion of oxygen from the solution while in storage. The exclusion of oxygen is accomplished by storing the solution under an inert atmosphere, such as nitrogen or other inert non-reactive gases. Various antioxidants may be used such as sodium formaldehyde sulfoxylate, ascorbic acid, and sodium, bisulfite, and are employed in antioxidant amounts, which are preferably within the range which is suitable for parenteral preparations, for example sodium formaldehyde sulfoxylate is used at a concentration of 0.5–1%.

The preparation may also include local anesthetics, such as procaine and xylocaine, for the purpose of reducing discomfort at the site of the injection.

Parenteral preparations of broad spectrum antibiotics for the treatment of humans and animals are usually made available to the doctor and veterinarian in 2 to 4 ml.

dosage units; and may contain anywhere from 10 to 125 mg. of antibiotic per ml. depending on the maximum dosage required over any given period.

It will thus be seen that the invention provides a stable liquid preparation of tetracycline as the metal acid complex, containing 10 to 125 mg./ml. of tetracycline. The composition of the complex contains from 3 to 4 moles of aluminum per mole of tetracycline, from 1 to 2 moles of calcium per mole of tetracycline, and from 6 to 12 moles of gluconic acid per mole of tetracycline. Most advantageously the preparation is titrated to a pH of about 7.5 to 9 by the use of a soluble, physiologically acceptable base, this being the pH range wherein tetracycline attains its optimum physiological absorption. The word tetracycline as used in this specification shall include the acid addition salts of tetracycline, as well as the base.

Stable liquid preparations of either 6-deoxy-6-demethyltetracycline, 6-demethyltetracycline, 6-deoxytetracycline, or 7-chloro-6-demethyltetracycline, may be attained by the use of the metal acid complex of said tetracyclines, again employing as the vehicle an aqueous solution of a physiologically acceptable glycol and having a pH of about 7.5 to 9.

The following examples are provided for illustrative purposes and may include particular features of the invention. However, the examples should not be construed as limiting the invention, many variations of which are possible without departing from the spirit or scope thereof.

EXAMPLE I

Stability of Aqueous Propylene Glycol Solutions of Tetracycline

This example illustrates the well-known fact that tetracycline as either the hydrochloride or neutral form is not physically stable in an aqueous propylene glycol solution.

A composition containing the following ingredients was prepared:

Tetracycline HCl ----------mg./ml-- 50
Sodium formaldehyde sulfoxylate --------percent-- 0.5
Propylene glycol ----------do---- 75
Magnesium chloride hexahydrate ----------do---- 2.5
Ethanolamine, to pH 8.5.
Water, q.s. ad 100%.

The composition was then added to a beaker containing distilled water. Immediately upon the addition of the preparation to the beaker of distilled water, a precipitate formed. The precipitate was subsequently identified as the antibiotic.

The aforementioned procedure was again followed using the same formulation but substituting for tetracycline HCl, tetracycline neutral. Upon the addition of this preparation to a beaker containing distilled water, a precipitate immediately formed, which was subsequently identified as the antibiotic.

Therefore, neither the tetracycline or its acid addition salts are physically stable in an aqueous propylene glycol formulation.

EXAMPLE II

Stability With Regard to Potency of Aqueous Propylene Glycol Solutions of Tetracycline This example demonstrates that tetracycline as either the hydrochloride or neutral form is not stable with regard to potency in an aqueous propylene glycol solution.

A composition containing the following ingredients was prepared:

Tetracycline HCl ----------mg./ml-- 45
Sodium formaldehyde sulfoxylate --------percent-- 0.5
Propylene glycol ----------do---- 75
Magnesium chloride hexyhydrate ----------do---- 2.5
Ethanolamine, to pH 8.5.
Water, q.s. ad 100%.

The preparation was then subjected to an accelerated stability study for a period of 3 weeks in which said preparation was stored at 37° C. and periodically analyzed for tetracycline content. The results of the stability study are set forth in the following table, and show at the end of 3 weeks the preparation had lost 83.4% of its original microbiological potency which is expressed in the mg. of tetracycline present in an ml. of the liquid formulation.

| Weeks at 37° C. | Microbiological Potency, mg./ml. | Percentage of Initial |
|---|---|---|
| Initial | 44.3 | 100 |
| 1 | 20.3 | 46 |
| 2 | 11.5 | 25.8 |
| 3 | 7.4 | 16.6 |

The aforementioned procedure was again followed using the same formulation but substituting for tetracycline HCl, tetracycline neutral. The results of the stability study are set forth in the following table, and show that at the end of 3 weeks the preparation had lost 85.3% of its original microbiological potency, which is expressed in the mg. of tetracycline present in an ml. of the liquid formulation.

| Weeks at 37° C. | Microbiological Potency, mg./ml. | Percentage of Initial |
|---|---|---|
| Initial | 44.6 | 100 |
| 1 | 20.2 | 45.2 |
| 2 | 11.9 | 24.6 |
| 3 | 6.5 | 14.7 |

Therefore, neither tetracycline or its acid addition salts are capable of forming aqueous propylene glycol formulations which are stable with regard to microbiological potency.

EXAMPLE III

Stability of Tetracycline Metal Acid Complex in Aqueous Propylene Glycol Solutions This example demonstrates that a physically stable aqueous propylene glycol solution of tetracycline is obtained by using the tetracycline metal acid complex.

A composition containing the following ingredients was prepared:

Tetracycline aluminum calcium gluconate complex (1:4:1:12) ----------g-- 44.1
Propylene glycol ----------ml-- 119
Sodium formaldehyde sulfoxylate ----------mg-- 850
Ethanolamine to pH 8.5.
Water, q.s. ad 170 ml.

The tetracycline complex was dissolved in approximately 30 ml. of distilled water with stirring. The sodium formaldehyde sulfoxylate was dissolved in 2–3 ml. of distilled water and then added to the formulation. The pH of the solution was elevated to 8.5 with ethanolamine and the volume was made up to 170 ml. with distilled water. Precipitation did not occur when this composition was diluted with copious amounts of water.

The composition was then tested with regard to stability expressed in potency. The following table, in which the figures represent quantities of tetracycline, demonstrates that aqueous propylene glycol solutions of tetracycline metal acid complex are stable with regard to potency retention.

Initial potency:
Theoretical ----------mg./ml-- 35
Actual ----------mg./ml-- 38.2

| | 2 months | 4 months |
|---|---|---|
| Room Temperature ..... mg./ml. | 37.7 | 35.6 |
| 42° C ..... mg./ml. | 34.3 | ..... |

EXAMPLE IV

Preparation of a Stable Solution of Tetracycline by in Situ Production of the Complex and Stability Thereof A composition containing the following ingredients was prepared:

| | |
|---|---|
| Tetracycline neutral (0.01 mole) | 4.44 g. |
| Aluminum isopropoxide (0.03 mole) | 6.12 g. |
| Calcium oxide (0.01 mole) | 0.56 g. |
| Glucono-Δ-lactone (0.06 mole) | 10.68 g. |
| Distilled water, 33⅓% | 32 ml.+make-up. |
| Propylene glycol, 66⅔% | 64 ml. |
| Sodium formaldehyde sulfoxylate, 0.5% | 480 mg. |
| Mono-ethanolamine, q.s. ad pH 8.5. | |

The aluminum isopropoxide and the glucono-Δ-lactone were added to distilled water and the mixture was then stirred overnight. The resulting solution was filtered to remove traces of unreacted solids and then distilled under vacuum to remove the isopropanol evolved during the formation of the aluminum guconate complex. After the isopropanol was removed, the volume of the aluminum gluconate solution was adjusted to 32 ml. with distilled water to make up for the water that was removed with the isopropanol during the vacuum distillation.

The tetracycline was then added to the above solution which was stirred until an essentially clear solution was obtained (approximately 30 minutes). The calcium oxide was added and stirring continued for approximately 3 hours until only traces of unreacted solids were present. The solution was then filtered and the propylene glycol was added slowly with stirring. The sodium formaldehyde sulfoxylate was predissolved in a minimal amount of distilled water (approximately 1 ml.) and then added to the formulation. The pH was then adjusted to 8.5 with mono-ethanolamine and the formulation was filled into ampules at a level of 2 ml./ampule. The ampules were then sealed under nitrogen.

The accelerated stability studies hereinabove set forth were repeated on the solutions obtained by the aforementioned procedure. The stability studies demonstrated a retention of potency over a sustained period of time.

What is claimed is:

1. A stable liquid composition of tetracycline, suitable for parenteral administration, comprising as a vehicle an aqueous solution containing from 30 to 80 percent of a physiologically acceptable glycol, said vehicle having dissolved therein [from 10 to 125 mg./ml. of a] tetracycline aluminum calcium gluconate complex, *containing 10 to 125 mg./ml. of tetracycline,* and said composition having a pH of about 7.5 to 9.

2. The composition of claim 1 containing 0.5–1% of an antioxidant.

3. The composition of claim 2 in which the antioxidant is sodium formaldehyde sulfoxylate.

4. The composition of claim 1 containing a base having a dissociation constant greater than $10^{-5}$.

5. The composition of claim 4 in which the base is monoethanolamine.

References Cited

The following references, cited by the Examiner, are of record in the patented file of this patent or the original patent.

UNITED STATES PATENTS

| | | | |
|---|---|---|---|
| 2,736,725 | 2/1956 | Ritter | 424—227 XR |
| 2,944,541 | 7/1960 | Sacchi et al. | 424—227 XR |
| 2,984,686 | 5/1961 | Blackwood et al. | 424—227 XR |
| 3,005,754 | 10/1961 | Granatek | 424—227 |
| 3,009,956 | 11/1961 | Noseworthy et al. | 260—559 |
| 3,017,323 | 1/1962 | Gordon et al. | 424—227 |
| 3,026,248 | 3/1962 | Noseworthy et al. | 424—227 |
| 3,053,892 | 9/1962 | Sieger et al. | 424—227 XR |
| 3,068,264 | 12/1962 | Sieger et al. | 424—227 XR |

LEWIS GOTTS, *Primary Examiner.*

S. K. ROSE, *Assistant Examiner.*

U.S. Cl. X.R.

260—559